Figure 1:
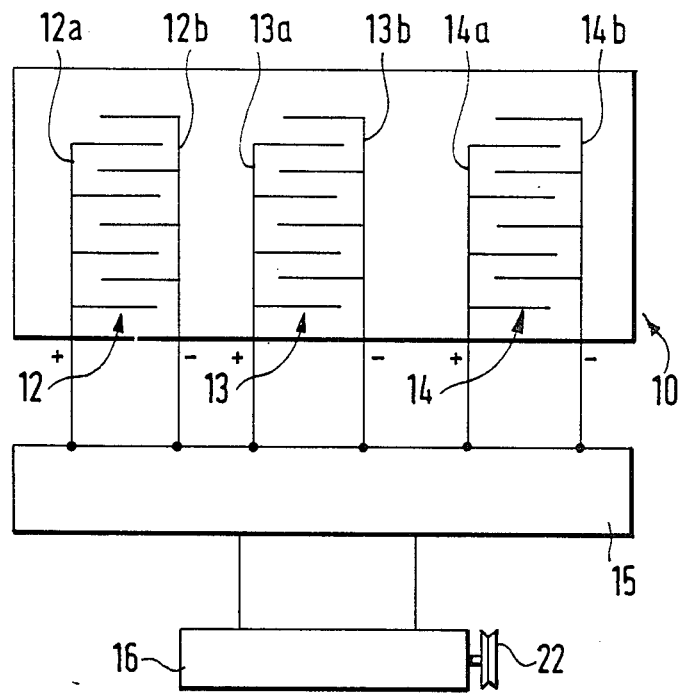

United States Patent [19]

Thomas

[11] Patent Number: 4,763,610

[45] Date of Patent: Aug. 16, 1988

[54] GAS GENERATOR

[76] Inventor: Iorwerth Thomas, 37 Medway Road, Brownhills, West Midlands, WS8 7JY, United Kingdom

[21] Appl. No.: 917,088
[22] PCT Filed: Dec. 30, 1985
[86] PCT No.: PCT/GB85/00604
§ 371 Date: Aug. 29, 1986
§ 102(e) Date: Aug. 29, 1986
[87] PCT Pub. No.: WO86/04117
PCT Pub. Date: Jul. 17, 1986

[30] Foreign Application Priority Data

Jan. 3, 1985 [GB] United Kingdom ............... 8500064

[51] Int. Cl.[4] ................................. F02B 43/08
[52] U.S. Cl. ........................... 123/3; 123/DIG. 12
[58] Field of Search ............... 123/DIG. 12, 3

[56] References Cited

U.S. PATENT DOCUMENTS

| 1,876,879 | 9/1932 | Drabold | 123/12 |
|---|---|---|---|
| 3,696,795 | 10/1972 | Smith et al. | 123/DIG. 12 |
| 4,023,545 | 5/1977 | Mosher et al. | 123/DIG. 12 |
| 4,111,160 | 9/1978 | Talenti | 123/DIG. 12 |
| 4,271,793 | 6/1981 | Valdespino | 123/3 |
| 4,369,737 | 1/1983 | Sanders et al. | 123/3 |
| 4,411,223 | 10/1983 | Kiely | 123/3 |
| 4,442,801 | 4/1984 | Glynn et al. | 123/DIG. 12 |

FOREIGN PATENT DOCUMENTS

| 25702 | 8/1972 | Australia . |
|---|---|---|
| 1016236 | 11/1952 | France . |
| 2338394 | 8/1977 | France . |
| 600745 | 4/1948 | United Kingdom . |
| 1561212 | 2/1980 | United Kingdom . |

Primary Examiner—E. Rollins Cross
Attorney, Agent, or Firm—Scrivener and Clarke

[57] ABSTRACT

The gas generator comprises an electrolysis unit 10 in which gas is generated for subsequent mixing with fuel in an engine assembly. The engine assembly comprises an engine 17, a fuel container for the engine, the aforesaid electrolysis unit 10 and a mixing chamber 26 in which the generated gas is intermixed with the fuel from the fuel container prior to combustion in the engine.

16 Claims, 1 Drawing Sheet

GAS GENERATOR

This invention relates to a gas generator and in particular to an electrolysis unit which is particularly, but not exclusively, for converting water into hydrogen and oxygen for use in conjunction with hydrocarbon fuel in prime movers, stationary engines, ships, furnaces, power stations and other applications. The invention further relates to an engine assembly utilising the gas generator.

It has been proposed hitherto to utilise hydrogen gas in conjunction with petrol in internal combustion engines as a petrol-saving measure. Typically, this has been carried out by producing the gas in relatively small quantities and storing the gas in a suitable container from which it is fed to the engine. However, hydrogen gas stored in that way is dangerous and an object of the present invention is to provide an electrolysis unit which will enable gas, typically hydrogen gas, to be produced in relatively large quantities thereby avoiding the need to use a storage tank for the gas in the vehicle.

According to one feature of the invention I provide an engine assembly comprising an engine, a fuel container for the engine, an electrolysis unit, an electrical supply for the electrolysis unit, and a mixing chamber in which gas generated by the electrolysis unit can be intermixed with fuel from the fuel container prior to combustion in the engine.

According to a further feature of the invention there is provided an electrolysis unit comprising a container, an electrolyte in the container and first and second sets of electrodes immersed in the electrolyte which receive electrical current. In use the electrical potential across the first set of electrodes may be different from the electrical potential across the second set of electrodes, and the different sets of electrodes may be brought into operation successively or in combination to provide extra gas output as engine speed rises. At least part of the oxygen is used to convert the pollutants produced in the cylinder from the combustion of the hydrocarbon fuel i.e. nitrous oxides and carbon monoxide, into non-polluting oxides, and if this chemical combination occurs in an engine cylinder not only is the exhaust pollution reduced, but extra power is created in the cylinder. There may also be re-combination of hydrogen and oxygen in the combustion chamber, also to produce power. To avoid the water produced by this re-combination from inhibiting sparking, as a further feature of my invention I provide spark electrodes disposed to be self-freeing of water, i.e. generally horizontally or substantially-horizontally such that the water formed drops fee or vibrates free to fall away.

It has been found that an electrolysis unit in accordance with the invention is particularly efficient and, by using a suitable electrical potential, e.g. provided by a rectified current derived from an alternator of the kind described in my co-pending application No. 2120865A, will provide sufficient gas to meet engine demand thereby avoiding the need to use an intermediate storage reservoir.

Preferably, a third set of electrodes is provided in the container and is immersed in the electrolyte.

Preferably, the unit is mounted in a motor vehicle and is connected to a fuel system whereby the gas, in use, is introduced into the fuel system for introduction into an iternal combustion engine. In such a case, the gas may be fed to the fuel system, e.g. a carburetor, through non-return means such as a water valve.

Where the unit is mounted in a vehicle, the electrical current may be derived from an alternator driven by the engine. Current derived from the alternator is preferably rectified to produce the electrical current necessary for powering the electrolysis unit.

Figure 2:
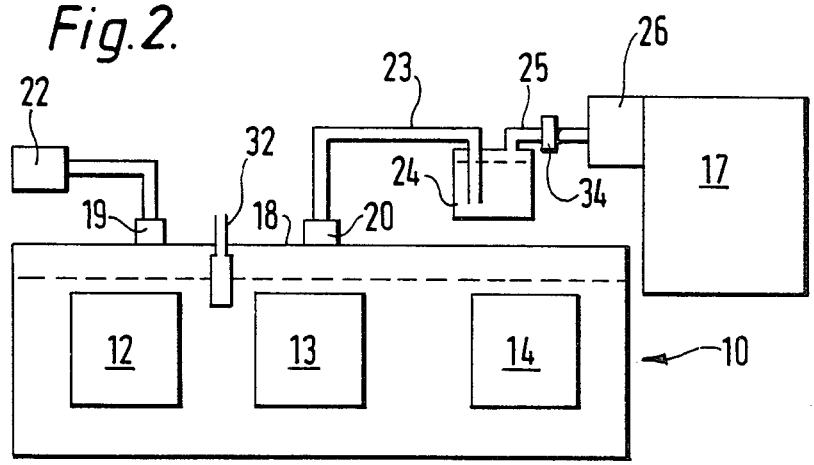

An electrolysis unit in accordance with the invention will now be described by way of example with reference to the accompanying drawings in which:

FIG. 1 is a plan view of a typical electrolysis unit in accordance with the invention showing electrical connections, and FIG. 2 is an elevation of the unit of FIG. 1 showing diagrammatically the connection of the unit to a fuel system of an internal combustion engine.

Tank 10 contains three sets of electrodes indicated generally at 12, 13 and 14 corresponding respectively to the aforesaid first, second and third sets of electrodes. The first set 12 comprises a bank of anode electrodes 12a and a bank of cathode electrodes 12b. The electrode sets 13 and 14 comprise respective anode and cathode sets 13a, 13b and 14a, 14b. The respective electrode sets are connected to a rectifier unit 15 which receives electrical current from an alternator 16 driven by the internal combustion engine 17 of a vehicle. The alternator is preferably of the kind set out in my co-pending British Application No. 2120865A which provides a high-current output at low voltage.

The sets of electrodes 12, 13 and 14 are immersed in an electrolyte in the tank 10 which may be a solution comprising 30% sodium hydroxide to 70% water. The proportions can vary as desired.

The tank is provided with a lid 18 which includes an inlet 19 and an outlet 20. Solution is fed to the inlet from a reserve tank 22 to maintain a constant level 21 of solution in the tank during electrolysis. Gas produced by electrolysis, typically hydrogen and oxygen, leaves the outlet 20 and passes through a conduit 23 having an outlet end positioned beneath the surface of water in a water valve 24. A pipe 25 has an inlet end located above the surface of the water in valve 24 and has an outlet end terminating at an air filter or an air intake of a carburetor 26 for the engine. The carburetor is connected to the usual fuel supply for the engine.

Once the engine is running, the alternator produces current which is rectified and then fed at potentials of, e.g. 3 to 4 volts, to the respective electrode sets 12, 13 and 14. If desired the potentials may be different for each set of electrodes. The electrodes may be of stainless steel. The spacing between adjacent electrodes of each set may be around 3/16 (4.76 mm).

The use of an electrolysis unit as described is particularly advantageous because it enables sufficient gas to be produced to avoid the use of an intermediate storage reservoir between the electrolysis unit and the carburetter. The use of a single electrolyte common to all the electrodes makes available more ions for the electrolysis unit as a whole than would be the case if the electrodes were immersed in respective individual containers of electrolytes. The use of the water valve prevents any risk of explosion travelling through pipe 23 from the engine.

The tank may be made of material such as plastics and can be as small as 6" (152 mm) wide, 5" (127 mm) deep and 8" (203 mm) long.

The electrolysis unit produces gas only while the engine drives the alternator which is another advantage over the gas-storage system where large quantities of gas may still be stored after the engine has been switched off.

The hydrogen and oxygen produced by the unit and fed to the engine produces a reduction in pollutant by-products of combustion. A typical exhaust emission analysis is set out below.

| | | |
|---|---|---|
| O2 | .6% | Oxygen |
| CO2 | 16% | Carbon Dioxide |
| CO1 | .7% | Carbon Monoxide |
| NO2 | 8.9% | Nitrogen Dioxide |
| N2 | 56% | Nitrogen |
| Unburnt Hydrocarbon fuel | 13.8% | |
| C | .9 to 1.0% | Carbon |
| Lead less than 2 parts per 1,000,000. | | |

Preferably the pipe 25 includes a valve 34 which controls the pressure of gas fed to the carburetor. In that way the pressure of the gas fed to the carburetor is maintained around 0.492 Kg (7 lbs/sq. inch).

The level of electrolyte in tank 10 may be sensed by a sensor 32 a signal from which results in transfer of solution from reserve tank 22 to tank 10.

I claim:

1. An engine assembly comprising an engine, a fuel container for the engine, an electrolysis unit, an electrical supply for the electrolysis unit, and a mixing chamber in which gas generated by the electrolysis unit can be mixed with fuel from the fuel container prior to combustion in the engine, the electrolysis unit having an electrolytic chamber, and first and second sets of electrodes in said electrolytic chamber, each set comprising a cathode and an anode, and means connecting said sets separately to said electrical supply.

2. An assembly as claimed in claim 1 in which the electrodes are electrically connected to a rectifier, the rectifier being electrically connected to an alternator.

3. An assembly as claimed in any of claims 1 or 2 in which the assembly is mounted in a motor vehicle, and in which the engine is an internal combustion engine.

4. An assembly as claimed in claim 3 in which the engine carries a carburetor, the carburetor including the said mixing chamber.

5. An assembly as claimed in claim 4 in which the engine carries a one-way valve, the valve having an outlet conduit connected to the said mixing chamber of the carburetor, the valve having an inlet conduit connected to the said electrolysis unit.

6. An assembly as claimed in claim 5 in which the one-way valve is a water-valve.

7. An electrolysis unit for use in the assembly as claimed in claim 1 comprising a container, an electrolyte in the container, first and second sets of electrodes immersed in the electrolyte, and means to supply the electrodes with electric current.

8. A method of fueling an engine driven by the combustion of hydrocarbon fuel comprising storing hydrocarbon fuel in a storage space adjacent the engine, providing an electrolysis unit including an electrolyte, said electrolyte being selected from the group which generates hydrogen and oxygen gases when a D.C. electric current is passed therethrough, providing within the electrolysis unit first and second sets of electrodes in said electrolyte, each set of electrodes comprising a cathode and an anode, connecting each set separately to an electrical supply, supplying D.C. current from said electrical supply to each of said sets of electrodes at currents and voltages to cause hydrogen and oxygen gases to be generated while drawing off hydrocarbon fuel from said storage space, enriching the drawn-off hydrocarbon fuel with the hydrogen and oxygen gases generated in said electrolysis unit, and feeding the hydrogen and oxygen-enriched hydrocarbon fuel to a combustion chamber for the engine.

9. A method as claimed in claim 8 in which the engine is an internal combustion engine having a carburetor controlling the amount of hydrocarbon fuel supplied, and wherein the hydrogen is mixed with the hydrocarbon fuel in the carburetor.

10. A method as claimed in claim 9 in which the hydrogen is fed to the carburetor through a one-way water valve.

11. A method as claimed in any of claims 8 to 10 in which the said electrolyte is an aqueous solution of sodium hydroxide.

12. A method as claimed in claim 11 in which the solution comprises 30% sodium hydroxide to 70% water, by weight.

13. A method as claimed in claim 8 in which the hydrogen has a pressure of at least 0.492 Kg/sq. cm (7 lbs/sq. inch) before being mixed with the hydrocarbon fuel.

14. A method as claimed in claim 8 in which the DC current is supplied at 4 volts.

15. A method as claimed in claim 8 in which the hydrocarbon fuel is mixed with a gas additional to hydrogen and selected from those adapted to reduce the emission of pollutant by-products from the engine, following combustion.

16. A method as claimed in claim 15 which includes oxygen.

* * * * *